US008185899B2

(12) United States Patent
Daly et al.

(10) Patent No.: US 8,185,899 B2
(45) Date of Patent: May 22, 2012

(54) PREDICTION BASED PRIORITY SCHEDULING

(75) Inventors: David M. Daly, Croton-on-Hudson, NY (US); Peter A. Franaszek, Mount Kisco, NY (US); Luis A. Lastras-Montano, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1288 days.

(21) Appl. No.: 11/683,147

(22) Filed: Mar. 7, 2007

(65) Prior Publication Data

US 2008/0222640 A1  Sep. 11, 2008

(51) Int. Cl.
*G06F 9/46* (2006.01)
(52) U.S. Cl. .................... 718/102; 718/103; 718/104
(58) Field of Classification Search .................. None
See application file for complete search history.

(56) References Cited

U.S. PATENT DOCUMENTS

| | | | |
|---|---|---|---|
| 7,095,752 B2 * | 8/2006 | Apostol et al. | 370/463 |
| 7,653,633 B2 * | 1/2010 | Villella et al. | 707/648 |
| 7,703,101 B2 * | 4/2010 | Cuomo et al. | 718/104 |
| 2005/0289312 A1 * | 12/2005 | Ghosal et al. | 711/167 |
| 2006/0168383 A1 * | 7/2006 | Lin | 710/243 |
| 2008/0055323 A1 | 3/2008 | Franaszek | |
| 2008/0155550 A1 * | 6/2008 | Tsafrir et al. | 718/103 |
| 2008/0172526 A1 * | 7/2008 | Verma et al. | 711/114 |
| 2008/0172673 A1 * | 7/2008 | Naik | 718/104 |

* cited by examiner

*Primary Examiner* — Jennifer To
*Assistant Examiner* — Abdullah Al Kawsar
(74) *Attorney, Agent, or Firm* — August Law, LLC; George Willinghan

(57) ABSTRACT

Systems and methods are provided that schedule task requests within a computing system based upon the history of task requests. The history of task requests can be represented by a historical log that monitors the receipt of high priority task request submissions over time. This historical log in combination with other user defined scheduling rules is used to schedule the task requests. Task requests in the computer system are maintained in a list that can be divided into a hierarchy of queues differentiated by the level of priority associated with the task requests contained within that queue. The user-defined scheduling rules give scheduling priority to the higher priority task requests, and the historical log is used to predict subsequent submissions of high priority task requests so that lower priority task requests that would interfere with the higher priority task requests will be delayed or will not be scheduled for processing.

20 Claims, 2 Drawing Sheets

PREDICTION BASED PRIORITY SCHEDULING

FIELD OF THE INVENTION

The present invention relates to task scheduling in computing systems.

BACKGROUND OF THE INVENTION

Computing systems receive requests for tasks, for example requests for systems resources and memory requests, from users, and the requests represent multiple types of tasks having different levels of priority. In such systems, the low priority requests are often processed after all high priority requests. However, different requests can use a single key resource for multiple cycles. Therefore, a low priority request that is started when there are no high priority requests, can still delay a subsequent high priority request that utilizes a common resource.

Write traffic is one example of a low priority task that is received in memory systems. Write requests are often buffered until the read queue is empty. However, the write request may interfere with future read requests when it is scheduled. Another example of lower priority memory requests are prefetches, i.e. wherein subsequent instructions are loaded into a queue, as well as memory requests marked as low priority by the application or the operating system. Compressed memory systems are another example of memory systems with multiple types of requests. In a compressed memory system, memory reorganizations can occur as low priority tasks. However, they take many cycles to complete. Reorganizations may occur rarely and can be buffered.

Therefore, systems and methods are needed that can schedule a variety of tasks requests so that the execution of higher priority tasks is not inhibited by lower priority tasks.

SUMMARY OF THE INVENTION

The present invention is directed to methods and systems that predict when it is advantageous to schedule or delay requests based upon past access patterns, including methods and systems that predict when high priority requests are likely and that schedule low priority requests to minimize predicted interference. Lowering the interference lowers queuing delays for the high priority requests and increases overall system performance.

In accordance with one exemplary method for scheduling tasks in accordance with the present invention, at least two queues are maintained for storing or holding tasks to be executed. Suitable tasks include resource requests within a computing system such as memory requests. Each queue is associated with a distinct priority level and contains the tasks to be processed such that the priority level of each task in any given queue corresponds to or is substantially the same as the priority level of that queue. In one embodiment, two queues are maintained, a high priority queue containing one or more high priority tasks and a low priority queue containing one or more low priority tasks. In order to place the tasks into the queues, the tasks to be processed are identified, and a priority level is associated with each identified task. Each identified task is then saved in the queue corresponding to its associated priority.

The scheduler checks if any tasks can be scheduled for processing in the system. If tasks can be scheduled, the tasks stored in the queues are then scheduled for processing or are postponed until later in accordance with factors including the associated priority level of each queue, a current status of each queue and a history of scheduled tasks. In addition, the tasks can be scheduled in accordance with a plurality pre-defined scheduling rules that predict if it is advantageous to schedule tasks or to postpone them. These scheduling rules include rules based on the status of the queues, such as scheduling tasks contained within queues that exceed pre-defined threshold criteria and scheduling tasks based upon the number of tasks contained within a given queue. In one embodiment, at least one pre-defined threshold criterion is associated with each queue, and these threshold criteria include, but are not limited to the number of tasks in the queue, the age of the oldest task in the queue and combinations thereof. Once scheduled, the tasks are processed or executed in accordance with this scheduling.

In one embodiment, a log containing a plurality of discrete, sequential time periods or bins is maintained. Each time period represents a substantially equivalent pre-determined length of time and each time period includes a list or set of tasks received during that period of time that are associated with a given priority level. In addition, tasks received during a current time period associated with the given priority level are recorded or saved in a current time period or current bin. Upon expiration of the current time period, the current time period or current bin is transferred to the log and the oldest time period or oldest bin is removed from the log. In order to schedule tasks in accordance with one or more of a plurality of pre-defined scheduling rules, a plurality of sample logs is created. Each sample log comprising a plurality of discrete, sequential time periods or sample bins corresponding to the maintained log of time periods, and each time period in each sample log contains a pre-determined number of tasks. Therefore, each sample log is a sample historical log of tasks. A given rule is associated with each sample log. The maintained logs are compared to the sample logs, and when a match is found, the rule associated with that sample log is executed.

Exemplary embodiments of the present invention include a method for scheduling task requests to be processed within a computing system. In accordance with this method, a list containing a plurality of task requests to be processed within the computing system is maintained. These task requests include resource requests within the computing system such as memory requests. In one embodiment, the list of task requests is maintained in at least two queues. Each queue is associated with a distinct priority level and contains one or more of the plurality of task requests. The associated priority level of each task request in any given queue is substantially the same as the distinct priority level of that queue. In another embodiment, two queues are maintained, a high priority queue containing one or more high priority task requests and a low priority queue containing one or more low priority task requests.

In order to initiate processing of the task requests contained within the list, one of the plurality of task requests is identified to be scheduled for processing. The task requests can be selected randomly or in accordance with prescribed selection criteria. In one embodiment, a priority level is associated with each one of the plurality of task requests, and this associated priority level is used to identify the task request to be scheduled for processing. When the task requests in the list are placed in two or more queues, the number of task requests contained within each queue can be used to identify the task request to be scheduled. In addition, the age of the oldest task request in each queue can be used to identify the task request to be scheduled.

After a task request has been identified for scheduling, a processing authorization is associated with the identified task request. This association is based on a history of task requests within the computing system. Suitable processing authorizations include immediately processing the identified task request, postponing processing of the identified task request for a specified period of time and rejecting processing of the identified task request. In one embodiment, the history of task requests is used to identify the probability of occurrence of future task requests during the processing of the identified task request, such that processing of these future task requests is in conflict with processing of the identified task request. Processing of the identified task request is either delayed or rejected when any identified probability of occurrence exceeds a pre-determined threshold.

In one embodiment, currently processing task requests and the time required to complete each identified currently processing task request are identified. Using this information, the processing authorization associated with the identified task request postpones processing of the identified task request for a specified period of time equal to a longest identified time to completion. Having identified the processing authorization for the identified task request, the identified task request is processed in accordance with the associated processing authorization.

In one embodiment in order to utilize the history of task requests to associate a processing authorization with a given task request, a historical log containing a plurality of discrete, sequential time periods is maintained. Each time period represents a substantially equivalent pre-determined length of time, and each time period contains a list of task requests received during that period of time that are associated with a given priority level. Task requests received during a current time period and associated with the given priority level are recorded. The current time period, i.e. the task requests logged during the current time period, is transferred to the historical log upon expiration of the current time period, and the oldest time period is removed from the historical. Therefore, the historical log is used to represent the history of task requests. In one embodiment, a plurality of sample logs is created. Each sample log includes a plurality of discrete, sequential time periods corresponding to the historical log of time periods, and each time period in each sample log contains a pre-determined grouping of task requests. A processing authorization is associated with each created sample log, and the historical log is matched to one of the created sample logs. Based upon this matching, the processing authorization associated with the matched sample log is associated to the current task request.

DETAILED DESCRIPTION

Figure 1:
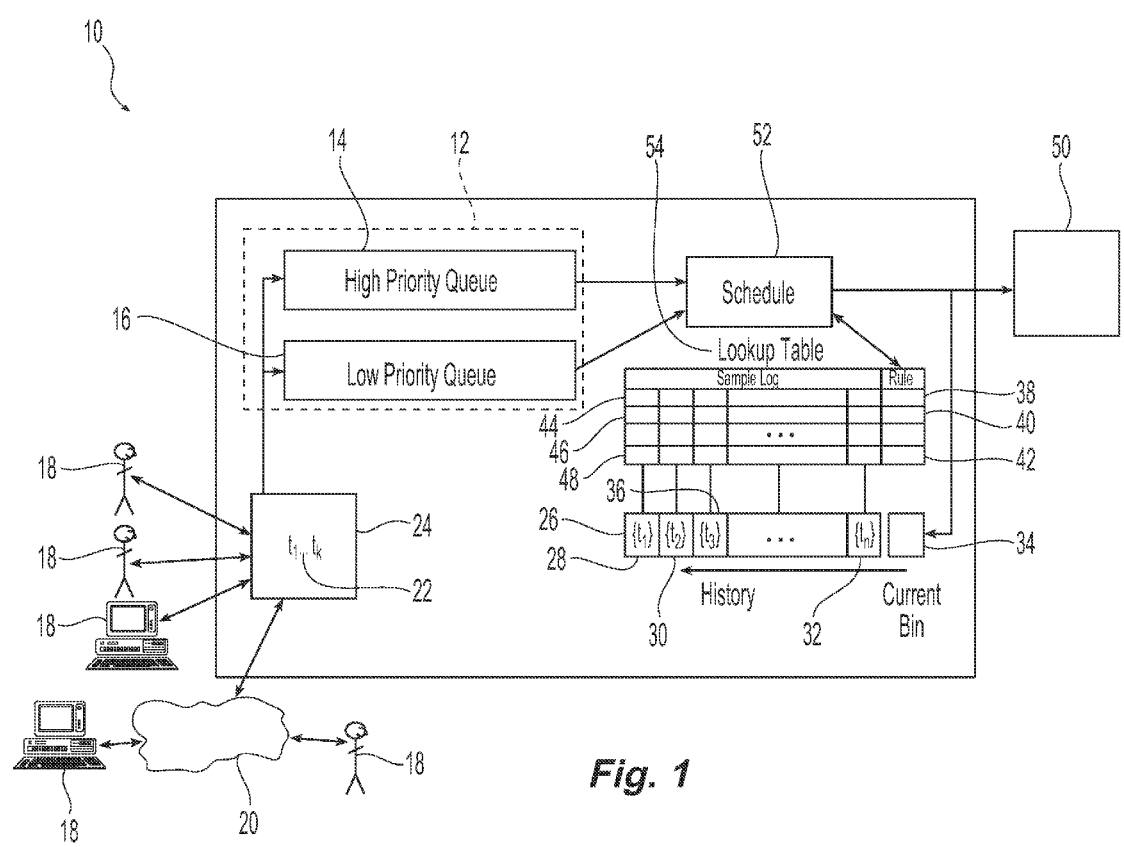
FIG. 1 is schematic representation of an embodiment of a system for scheduling tasks in accordance with the present invention.

Referring initially to FIG. 1, an exemplary embodiment of a system 10 for use in scheduling tasks in accordance with the present invention is illustrated. As illustrated, the system 10 receives a plurality of tasks or task requests 22 from a plurality of users 18. These submitted task requests 22 are to be scheduled for processing or execution by the system 10 in accordance with the history of task requests and one or more prescribed rules. Suitable users include, but are not limited to, persons such as system administrators and customers, computing systems servers and applications. In one embodiment, the users 18 are in communication with the system 10 through one or more networks 20, including local area networks and wide area networks. Suitable task requests 22 that are submitted by the users 18 include, but are not limited to, requests for computing system resources including requests for memory resources, processor resources and bandwidth. Requests for memory resources can take the form of read requests and write requests among others.

In one embodiment, the system 10 includes at least one storage location buffer 24 to initially receive and hold the submitted task requests, for example as a list of task requests. In one embodiment, the system 10 also includes a plurality of queues 12 to hold the task requests. Although illustrated as two queues, any number of queues can be contained within and utilized by the system. The queues are differentiated based upon one or more characteristics of the task requests to be scheduled. For example, a queue can be established for each user that submits task requests or for a particular type or class of task request. Preferably each queue is associated or assigned a priority level. That is, each queue contains one or more task requests wherein each task request within that queue has a priority for execution or processing that is equivalent to the priority level assigned to that queue. As illustrated, the system includes two queues, a high priority queue 14 and a low priority queue 16. In one embodiment, the system is capable of evaluating each task request submitted and held in the buffer 24. Upon evaluation, the system can determine the proper priority level for each task request and can communicate each task request to the appropriate queue, i.e. the queue for the priority level associated with a given task request. The queues can store the task requests, preferably in accordance with the order in which the task requests were received by the system.

The system includes a scheduling mechanism or scheduler 54 that is in communication with the queues 12. The scheduler 54 is capable of reading task requests from either the storage location buffer or the queues and delivering those task requests to a destination 50 for processing. Suitable destinations include any destination such as computing systems or components within the computing system, e.g., nodes, that can execute the task requests. In one embodiment, the scheduler is capable of determining a schedule or order and times for executing the task requests contained in the queues. The scheduler determines this order and times in accordance with one or more predefined scheduling rules. These rules can be based upon the priority associated with the task requests, the order in which the task requests were received, the current state of the queues as well as other factors. For example, a rule can state that low priority task requests, i.e. task requests contained in the low priority queue, are to be scheduled only if there are no pending task requests in the high priority queue. Other scheduling rules can be based upon the history of the types of task requests received and the likelihood that these task requests will be submitted to the system at any given time. Therefore, in one embodiment the system in general and the scheduler in particular includes a predictor mechanism that can determine, for example, the probability of interference or overlap between a given low priority task request and a high priority task request. Suitable predictors utilize static, architecture driven policies or can utilize adaptive, online policies. In one embodiment, the predictor determines the probability of interference between executed task requests, for example by using decision logic based on the probability that a second higher priority task request will be received while a first lower priority task request is being executed. In another embodiment, the predictor determines if interference is likely or unlikely. In another embodiment, low priority task requests are scheduled when interference in unlikely. In one embodiment, low priority task requests are scheduled using a function of the probability of interference, or some quantization of that probability, and the queue length of the low priority task requests.

In one embodiment, in order to provide for scheduling and predicting empirically, that is based upon the history of task requests, e.g., recent task request submissions, the system includes a historical log 26 arranged as a plurality of time intervals or bins 28,30,32,36. Each bin represents a period of time having the same duration, for example a set number of minutes or a set number of cycles. Associated with each bin is a set, i.e. $\{t_1\}, \{t_2\}, \ldots, \{t_k\}$, of the task requests submitted to the system during that time period. This set can contain all submitted task requests or a subset of the submitted task requests. Preferably, the set contains the high priority task requests; therefore, the historical log provides a historical record or snapshot of the high priority task request submissions. In addition to the time periods in the historical log, a current bin 34 corresponding to the current time period is also provided. As task requests are submitted during the current time period, they are logged into the current bin. Upon expiration of the current time period, the current bin is placed into the historical record, and the bin in the historical log having the oldest aggregate duration 28 is removed from the log. The size of the historical log, i.e. the length of time represented by the historical log, can be varied in accordance with specific system requirements.

The scheduler is in communication with the historical log and the current bin. In one embodiment, the scheduler can communicate received task requests to the current bin. In order to provide for the use of the historical log in scheduling task requests, the system includes a plurality of scheduling rules 54 that include criteria 44,46,48 and associated rules 38,40,42. In one embodiment, each criterion is associated with one rule. Therefore, the determination of which rule or rules apply involves selecting the proper criteria that match a given task request. In one embodiment, the scheduling rules are arranged as a lookup table containing a plurality of pre-defined or sample historical logs. The current historical log is compared with the sample logs in the look up table on a bin-by-bin basis. Matches between the current historical log and the sample logs are found, and the rules associated with these matches are used in the scheduling of task requests. In one embodiment, the historical log is compared to the sample log on a bin-by-bin basis, and each bin in the sample log specifies a comparison criterion. Possible comparison criterion for the bins include, but are not limited to, whether the values in the two bins are the same, what the relationship is between the bins (greater than, greater than or equal to, less than, less than or equal to) and whether a bin in the sample log matches all values.

In one embodiment, the system includes a memory controller that has been modified to support scheduling. The memory controller includes the two queues shown in FIG. 1, a first queue for the high priority requests and a second queue for the low priority requests. The memory controller can add information or information bits to a given task request to identify that request as either high priority or low priority. In one embodiment, the low priority requests are write transactions, and no extra information needs to be added to these task requests to identify the requests as low priority. The scheduler that is included in the memory controller schedules the memory request contained in the queues based on the status of the two queues and the previous history of memory requests as scheduled by the schedule block. The scheduler instructs the memory controller to schedule a particular memory request, and the standard memory controller functionality is used to process the scheduled request.

In one embodiment, the historical log can also be maintained in the memory controller, including both the history buffer, and a current bin entry. In one embodiment, the previous M cycles, that is the previous M memory cycles, are broken into N bins. The N bins of the history buffer indicate how many high priority task requests were received in each of the previous N time bins. The current bin is used to store and to update a count of high priority task requests since the last time bin was added to the history buffer. Every M/N cycles the current bin is copied to the first entry in the history buffer and then cleared, and the contents of each entry in the history buffer are shifted over one entry, updating the history buffer. At all times, the history buffer contains the number of high priority task requests over the last N time bins. The rule set or lookup table in the associated with the history buffer in the memory controller maintains a list of rules to be used to determine if a low priority memory request should be scheduled or not, for example if there are currently no high priority task requests pending. The high priority memory request history is compared against the lookup table of scheduling rules. If it matches any of the rules, a low priority memory request can be scheduled. In one embodiment, each rule indicates either a low priority memory request should be scheduled or should not be scheduled. In one embodiment, the rules are maintained in accordance with a pre-determined hierarchy or order, and the first rule that matches is used. One of the rules may be a default rule that matches all possible historical logs and that defines the default scheduling behavior.

In accordance with one exemplary embodiment of a method for scheduling task requests, for example scheduling task requests in one or more computing systems, in accordance with the present invention, a list of task requests is maintained. This list includes a plurality of task requests received form one or more users for tasks to be processed within the computing system. In one embodiment, the plurality of task requests within the list is divided into at least two queues. Each queue has an associated characteristic that is used in sorting the task requests into the queues. These characteristics can be any desired quality of the task requests or can be other user-defined characteristic, for example time of day and source of task request. In one embodiment, the characteristic is priority level, and each queue has an associated priority level. Task requests to be processed are contained within each queue, and the task requests in any given queue have an associated priority level the same as the priority level of that queue. For example each queue can contain one or more task requests. Alternatively, one or more of the queues may not contain any task requests. In one embodiment, the priority levels are user defined and represent the weight or priority to be assigned to a given task request when deciding whether or not to schedule that task request. The number of queues can be varied depending upon the number of characteristics or the level of priority to be used. In one embodiment, two queues are maintained, a high priority queue containing one or more high priority task requests and a low priority queue containing one or more low priority task requests.

In one embodiment, the task requests to be processed are identified. Suitable methods for identifying the task requests include, but are not limited to, receiving task requests from one or more users or executing recurring task requests. In one embodiment, each task request represents a resource request within a computing system. In one embodiment, the resource requests are memory requests. A priority or priority level is associated with each identified task request, and each task request is communicated to and saved in the queue corresponding to its associated priority.

Having identified the task requests, determined the priority of each task request and stored the prioritized task requests in the appropriate log, a task request from the list is identified to be scheduled for processing. Task requests can be identified randomly or in accordance with one or more pre-defined criteria. In one embodiment, task requests are identified and scheduled for processing in accordance with the priority of each queue, a current status of each queue and a task request history. In addition to using the priority level, the task requests are identified and scheduled in accordance with a plurality of pre-defined scheduling rules.

In one embodiment, threshold criteria and contents of each queue are included in the scheduling rules. Therefore, in one embodiment, task requests are scheduled from queues that have exceeded pre-defined threshold criteria and that have a given number of task requests contained therein. In one embodiment, at least one pre-defined threshold criterion is associated with each queue. Suitable threshold criteria include, but are not limited to, the number of task requests in the queue, the age of the oldest task request in the queue and combinations thereof. In one embodiment, scheduling and processing of the task requests contained in the queues includes not scheduling and processing any of the task requests even though the queues are not empty. For example, the queues may contain lower priority task requests, and these task requests are not scheduled, for example, based on the likelihood that a higher priority task request may have to be scheduled in a subsequent time period.

In one embodiment, after identifying a task request form the list of task requests to be scheduled for processing either randomly or in accordance with one or more scheduling rules, a processing authorization is identified for the identified task request. The processing authorization is identified based on a history of task requests within the computing system. In one embodiment, the historical log is used to express the history of task requests. Suitable processing authorizations include, but are not limited to, immediately processing the identified task request, postponing processing of the identified task request for a specified period of time and rejecting processing of the identified task request. When the historical log is used, the processing authorizations can be used as part of the associated rules, e.g. in the look up table, that is associated with the sample log. Having identified the processing authorization, the identified task request is processed in accordance with the associated processing authorization.

Figure 2:
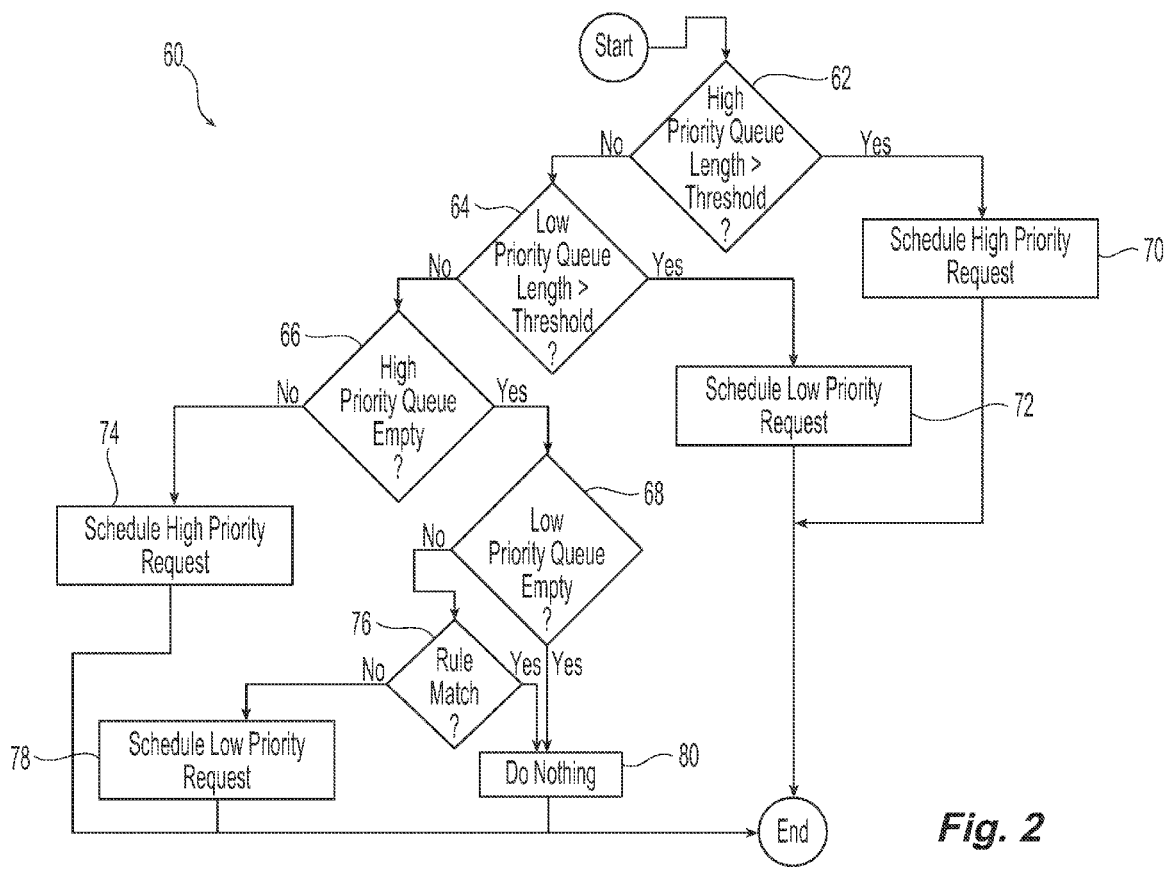
FIG. 2 is a flow chart illustrating an embodiment of a scheduling flow for use in scheduling tasks in accordance with the present invention.

Referring to FIG. 2, an exemplary embodiment of decision logic 60 used to determine which task request to schedule is provided. The logic is illustrated for a list of task requests divided into two queues, a high priority queue and a low priority queue using a single threshold determination and the number of task requests contained in each queue. Other embodiments are possible where the number of queues and threshold determinations are different. In addition, other rule-based determinations can also be included in the logic. Although illustrated as a single pass process, the logic can be run as an iterative process or a continuous loop.

As illustrated, a threshold value for the number of task requests in each queue has been established. In one embodiment, the threshold for the low priority queue can be infinite to indicate that this case should never happen. Initially, the high priority queue is checked to see if it exceeds the established threshold 62, that is there are more task requests in the high priority queue than permitted. If the threshold for the high priority queue has been exceeded, then a high priority task request from that queue is scheduled 70. If the high priority queue threshold has not been exceeded, then the low priority queue is checked to see if it exceeds the established threshold 64, that is there are more task requests in the low priority queue then permitted. If the low priority queue threshold has been exceeded, then a low priority task request is scheduled 72. If the low priority queue threshold has not been exceeded, then the high priority queue is checked to see if it is empty 66. If the high priority queue is not empty, then a high priority task request is scheduled 74. If the high priority queue is empty, then the low priority queue is checked to see if it is empty 68. If the low priority queue is empty, then no task requests are scheduled 80. If the low priority queue is not empty, then any additional scheduling rules applicable to the scheduling of the low priority task requests are checked for a match with current system conditions 76. In one embodiment, these rules are rules that govern a potential conflict or interference between a low priority task request and a high priority task requests based upon current conditions and the historical records of task request submissions. Matches to the rules indicate that an interference is likely. Therefore, as illustrated, if none of the rules match, then a low priority task request is scheduled 78. If one or more rules is matched, then no task request is scheduled 80. In other embodiments, low priority task requests may be scheduled following a rules match so long as the task request is scheduled in accordance with the rule.

In one embodiment, task requests are probabilistically scheduled from the queues. Matches to a rule indicate a certain distribution of task requests that should be scheduled from each queue. A queue will be selected randomly, based on the probability given by the rule, and a task request from that queue will be scheduled, resulting in a certain level of service for each queue. Therefore, high priority task requests receive a better level of service than lower priority task requests; however, lower priority task requests are still processed even if there are high priority task requests.

In one embodiment, a log or historical log containing a plurality of discrete, sequential time periods is maintained. Each time period represents a substantially equivalent predetermined length of time, and each time period in the log contains a list or set of task requests received during that period of time that are associated with a given priority level, preferably a high priority level. In addition, task requests received during a current time period associated with the given priority level are recorded. The task requests recorded in the current time period are transferred to the log upon expiration of the current time period, and an oldest time period is removed from the log. This log is then used to schedule the task requests in accordance with the plurality pre-defined scheduling rules, as illustrated for example in FIG. 2.

In one embodiment, the plurality of rules to be matched are expressed by creating a plurality of sample logs. Each sample log corresponds to the maintained historical log of time periods and represents a given pattern of received task requests over time. A given rule, e.g., schedule a task request, do not schedule a task request or delay the start of a task request, is associated with each created sample log. At any time the rule is evaluated in the scheduling logic, the maintained historical log at that time is compared to all of the sample logs to find a match between the historical log and one or more of the created sample logs. If a match is found, the rule associated with the matched sample log is executed.

In one embodiment, the rules in the sample log or lookup table are pre-computed and stored in the table. One set of rules can be based on the periodicity of receipt of certain task requests, e.g. memory requests. For example, there is a certain amount of time a given task request requires for completion, and that time is pre-computed. If there was a task request one period ago, the user that made the task request may make another task request, so the associated rule would state to not schedule a low priority memory request. In another embodiment, a learning algorithm is used to compute a rule. Consider the following rules, aimed at exploiting the end of bursts of activity: i) If R bins indicate high priority activity, and the R+1 bin does not, then schedule low priority activity in the next time slot; ii) If the previous two bins have no high priority activity, schedule low priority activity. A learning component could maintain the fraction of times F that the R+2, and R+3 bins have no activity for R=1, 2, . . . V, given activity in each of the previous R bins. The minimum value of R for which F is below a given threshold, could then be employed in the above.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for scheduling tasks in a computing system in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for scheduling task requests, the method comprising:

maintaining a list comprising a plurality of task requests received during a current time period to be processed within a computing system;

identifying one of the plurality of task requests to be scheduled for processing; maintaining a historical log comprising a plurality of discrete time periods, each discrete time period equivalent to the current time period and comprising a history of task requests submitted to the computing system during that discrete time period;

identifying a plurality of sample logs, each sample log comprises a plurality of discrete, sequential time periods corresponding to the historical log of time periods and comprising a given pattern of task requests received over that time period and each sample log associated with a processing authorization comprising a scheduling rule selected from the group comprising immediately processing the identified task request, postponing processing of the identified task request for a specified period of time and rejecting processing of the identified task request;

associating a processing authorization for the identified task request by matching the historical log to one of the plurality of sample logs and identifying the processing authorization associated with the matched sample log; and processing the identified task request in accordance with the associated processing authorization.

2. The method of claim 1, wherein:

the method further comprises associating a priority level with each one of the plurality of task requests; and the step of identifying one of the plurality of task requests further comprises using the associated priority levels to identify one of the plurality of task requests to be scheduled for processing.

3. The method of claim 2, wherein the step of maintaining the list further comprises maintaining the list in at least two queues, each queue associated with a distinct priority level and comprising one or more of the plurality of task requests, wherein the associated priority level of each task request in any given queue is substantially the same as the distinct priority level of that queue.

4. The method of claim 3, wherein the step of maintaining the list in at least two queues further comprises:
maintaining a high priority queue containing one or more high priority task requests; and
maintaining a low priority queue containing one or more low priority task requests.

5. The method of claim 3, wherein the step of identifying one of the plurality of task requests to be scheduled further comprises at least one of using a number of task requests contained within each queue to identify the task request to be scheduled and using an age of the oldest task request in each queue to identify the task request to be scheduled.

6. The method of claim 1, wherein the step of associating a processing authorization for the identified task request by matching the historical log to one of the plurality of sample logs further comprises using the matching to identify a probability of occurrence of future task requests during the processing of the identified task request, wherein processing of the future task requests is in conflict with processing of the identified task request.

7. The method of claim 6, wherein the step of associating the processing authorization further comprises at least one of delaying processing of the identified task request and rejecting processing of the identified task request when any identified probability of occurrence exceeds a pre-determined threshold.

8. The method of claim 1, further comprising identifying currently processing task requests and a time to complete each identified currently processing task request, wherein the step of associating a processing authorization further comprises associating the processing authorization to postpone processing of the identified task request for a specified period of time equal to a longest identified time to complete.

9. The method of claim 1, wherein each discrete time period in the historical log comprises a list of task requests received during that discrete period of time that are associated with a given priority level and the method further comprises:
recording task requests received during a current time period associated with the given priority level; and
transferring the current time period to the historical log upon expiration of the current time period and removing from the historical log an oldest time period.

10. The method of claim 9, wherein each time period in each sample log comprises a pre-determined grouping of task requests.

11. The method of claim 1, wherein the plurality of task requests comprises resource requests within the computing system.

12. The method of claim 11, wherein the resource requests comprise memory requests.

13. A method for scheduling task requests, the method comprising:
maintaining a high priority queue containing one or more high priority task requests;
maintaining a low priority queue containing one or more low priority task requests;
maintaining a historical log comprising a plurality of discrete, sequential time periods, each time period representing a substantially equivalent pre-determined length of time and each time period comprising a list of high priority task requests received during that period of time;
recording high priority task requests received during a current time period in a current time period log;
transferring the current time period log to the historical log upon expiration of the current time period and removing from the historical log an oldest time period log;
creating a plurality of sample logs, each sample log comprising a plurality of discrete, sequential time periods corresponding to the historical log of time periods and each time period in each sample log comprising a given pattern of high priority task requests received during that time period;
associating a given scheduling rule with each created sample log;
matching the historical log to the given pattern of one of the created sample logs; and
executing the scheduling rule associated with the matched sample log.

14. A non-transitory computer-readable storage medium containing a computer-readable code that when read by a computer causes the computer to perform a method for scheduling task requests, the method comprising:
maintaining a list comprising a plurality of task requests received during a current time period to be processed within a computing system;
identifying one of the plurality of task requests to be scheduled for processing;
maintaining a historical log comprising a plurality of discrete time periods, each discrete time period equivalent to the current time period and comprising a history of task requests submitted to the computing system during that discrete time period;
identifying a plurality of sample logs, each sample log comprises a plurality of discrete, sequential time periods corresponding to the historical log of time periods and comprising a given pattern of task requests received over that time period and each sample log associated with a processing authorization comprising a scheduling rule selected from the group comprising immediately processing the identified task request, postponing processing of the identified task request for a specified period of time and rejecting processing of the identified task request;
associating a processing authorization for the identified task request by matching the historical log to one of the plurality of sample logs and identifying the processing authorization associated with the matched sample log; and
processing the identified task request in accordance with the associated processing authorization.

15. The non-transitory computer readable storage medium of claim 14, wherein:
the method further comprises associating a priority level with each one of the plurality of task requests; and
the step of identifying one of the plurality of task requests further comprises using the associated priority levels to identify one of the plurality of task requests to be scheduled for processing.

16. The non-transitory computer readable storage medium of claim 15, wherein the step of maintaining the list further comprises maintaining the list in at least two queues, each queue associated with a distinct priority level and comprising one or more of the plurality of task requests, wherein the associated priority level of each task request in any given queue is substantially the same as the distinct priority level of that queue.

17. The non-transitory computer readable storage medium of claim 16, wherein the step of maintaining the list in at least two queues further comprises:
   maintaining a high priority queue containing one or more high priority task requests; and
   maintaining a low priority queue containing one or more low priority task requests.

18. The non-transitory computer readable storage medium of claim 16, wherein the step of identifying one of the plurality of task requests to be scheduled further comprises at least one of using a number of task requests contained within each queue to identify the task request to be scheduled and using an age of the oldest task request in each queue to identify the task request to be scheduled.

19. The non-transitory computer readable storage medium of claim 14, wherein the step of associating a processing authorization for the identified task request by matching the historical log to one of the plurality of sample logs further comprises using the matching to identify a probability of occurrence of future task requests during the processing of the identified task request, wherein processing of the future task requests is in conflict with processing of the identified task request.

20. The non-transitory computer readable storage medium of claim 19, wherein the step of associating the processing authorization further comprises at least one of delaying processing of the identified task request and rejecting processing of the identified task request when any identified probability of occurrence exceeds a pre-determined threshold.

* * * * *